RINGING TRIGGER MEANS FOR FLIP-FLOP

Filed Aug. 20, 1963 2 Sheets-Sheet 1

INVENTORS.
ALBERT M. BATES
JOSEPH J. KAREW
BY Vincent L. Carney
ATTORNEY

RINGING TRIGGER MEANS FOR FLIP-FLOP

Filed Aug. 20, 1963 2 Sheets-Sheet 2

INVENTORS.
ALBERT M. BATES
JOSEPH J. KAREW
BY
Vincent L. Carney
ATTORNEY

United States Patent Office 3,309,529
Patented Mar. 14, 1967

3,309,529

RINGING TRIGGER MEANS FOR FLIP-FLOP

Albert M. Bates, Davisville, and Joseph J. Karew, Warminster, Pa., assignors to Burroughs Corporation, Detroit, Mich., a corporation of Michigan Filed Aug. 20, 1963, Ser. No. 303,254
10 Claims. (Cl. 307—88.5)

This invention relates to trigger circuits and more particularly, to trigger circuits for use with rapidly operating bistable devices.

Flip-flops or bistable devices have wide application in the electronic art and particularly in computers. These devices have two stable operating states and are capable of providing a voltage output at either of two terminals. In computer applications it is frequently desirable for these flip-flops to change state very rapidly. Trigger circuits are utilized to provide appropriate voltage pulses to the flip-flops to cause this rapid switching.

The trigger circuits used with high speed transistor flip-flops often cause the occurrence of time race, which is the accidental reswitching of a flip-flop back to its original state by part of the trigger pulse. Often the leading edge of the trigger pulse will switch the flip-flop to its desired state and then the trailing edge will reswitch the flip-flop back to its original state. Accordingly, it is desirable to provide an anti-time race trigger circuit for use with high speed flip-flops.

It is an object of this invention to provide an improved trigger circuit for use with transistor flip-flops.

It is a further object of this invention to provide an anti-time race trigger which is compatible with high speed flip-flops.

It is a still further object of this invention to provide a trigger circuit which will switch the flip-flop only with the trailing edge of an input pulse.

It is a still further object of this invention to provide a rapidly operating transistorized flip-flop that is free from time race difficulties for use in computer operation.

In accordance with this invention an input from a logical circuit in combination with a synchronizing clock pulse causes an input pulse to activate the trigger circuit. In response, the trigger circuit generates a positive pulse and applies this pulse to a capacitor and inductor differentiator. This differentiator stores the leading edge of this positive pulse for a period of time which is equal to the time-width of the clock pulse. It is then applied to a transistor flip-flop having dynamic switching capabilities, and switches on the non-conducting portion of this flip-flop.

The invention and the above noted and other features thereof will be understood more clearly and fully from the following detailed description with reference to the accompanying drawings in which.

Figure 1:
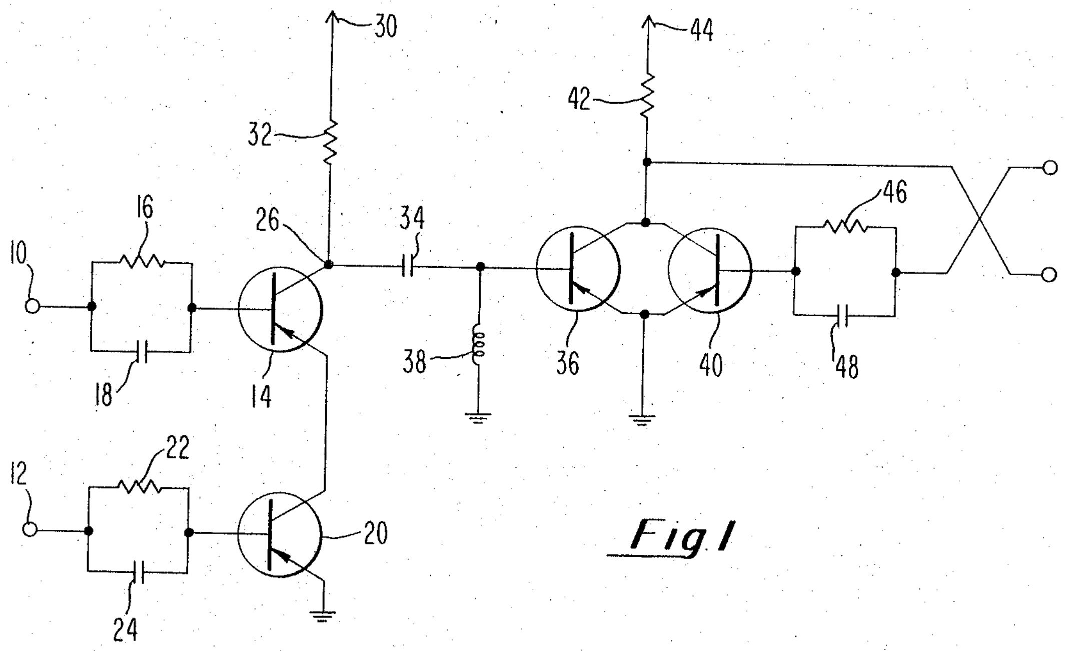
FIG. 1 is a schematic circuit diagram of a trigger circuit which is an illustrative embodiment of the invention.

Referring now in particular to FIG. 1 a schematic circuit diagram of a trigger is shown having a logic input terminal 10 and a clock pulse input terminal 12. The logic input terminal 10 is connected to the base of PNP transistor 14 through the parallel combination of resistor 16 and capacitor 18; the clock pulse input terminal 12 is connected to the base of PNP transistor 20 through the parallel combination of the resistor 22 and capacitor 24. The emitter of transistor 20 is grounded and its collector is connected to the emitter of transistor 14. The collector of transistor 14 is connected to terminal 26. Terminal 26 is connected to the negative source of voltage 30 through resistor 32 and also to one plate of capacitor 34. The other plate of capacitor 34 is connected to the base of PNP transistor 36 and also to one end of inductor 38. The other end of inductor 38 is grounded.

Transistors 14 and 20 operate in Class C mode and together constitute an inverting negative AND gate. The synchronizing clock pulses, which are applied to terminal 12, are in the form of one-half sine waves. When these negative clock pulses are applied to terminal 12 concurrently with a negative output from logic circuitry at terminal 10, both transistors 14 and 20 are switched "on" resulting in a positive pulse at terminal 26. This pulse results from a flow of current from ground to the negative source 30 through the transistor 20, the transistor 14, and the resistor 32 causing the negative voltage from the source 30 to be dropped primarily across resistor 32 rather than across the transistors 14 and 20.

When the voltage at terminal 26 is rising the transistors 20 and 14 act as drivers for a positive one-half sine wave into a high-pass LC (inductor-capacitor) section comprised by the capacitor 34 and the inductor 38. The transistor 36 is reversed biased causing the load impedance to be much higher than the impedance of the inductor 38. When the resonant frequency of the circuit comprising the driver of the sine waves, the capacitor 34, and the inductor 38 is equal to or greater than the frequency of the half sine wave pulses, the waveform at the base of the transistor 36 will show ZERO phase shift and a voltage gain which is one or greater. In order to achieve this condition, the capacitance of capacitor 34 in farads multiplied by the inductance of inductor 38 in henries must be approximately equal to the reciprocal of 2 pi squared multiplied by the reciprocal of the frequency the half sine wave pulses squared.

When the peak of the sine wave that is generated by the transistors 14 and 20 is reached, these transistors begin to turn off. The energy from the rising portion of the half sine wave is stored in the capacitor 34 and in the inductor 38. The impedance of the path leading from these reactances to ground through the transistors 14 and 20 becomes very high by comparison to the impedance of the resistor 32 leading to the source of negative voltage 30. Therefore, as the sine wave decreases the circuit comprised by the resistor 32, the capacitor 34, and the inductor 38 may be thought of as a series RLC "ringing" network that has been energized. In this circuit the inductor 38 releases its stored energy and "rings" toward a negative voltage that is some value slightly less than the positive excursion of the half sine wave. The value of this negative excursion will depend upon the Q of the inductor 38 and upon the value of the damping resistor 32.

When this negative excursion, which is the trigger voltage for the flip-flop, reaches the emitter threshold voltage of the transistor 36, the transistor 36 will go into conduction quite rapidly due to the overdrive applied by the inductor 38. The turning on of the transistors 36 initiates the switching action of the flip-flop and at the same time clamps a voltage across the inductor 38 which is equal to the base to emitter voltage drop across the transistor. The "ringing" circuit which consists of the resistor 32, the capacitor 34 and the inductor 38 will provide another small positive voltage pulse following this negative switching pulse. This positive pulse will turn off the transistor 36 after the switching action for the flip-flop has been initiated. This places the flip-flop in a condition to be triggered from its other side if necessary.

It is pointed out here that the combination of the capacitor 34 and the inductor 38 in this trigger circuit is more than a differentiating trigger. The "ringing" action which is important to the operation of this circuit is not present in the usual capacitor-resistor differentiator. Thus this "ringing" circuit provides a faster turn on of the transistor 36 and a positive turn off of this transistor once the switching action has been initiated. With the usual differentiator, the transistor 36 would be driven heavily into saturation and would be slow in turning off due to minority carrier storage effects. This would slow down the circuit operation. If a diode were to be used in place of the inductor 38 to provide a differentiator, excess energy would be dissipated in the resistor 32. Also, diodes which do not have short reverse recovery times would rob available base charge that would otherwise aid in turning on the transistor 36.

The remainder of the schematic circuit diagram of FIG. 1 may best be thought of as part of the flip-flop which is to be triggered. This flip-flop will be described in greater detail in connection with FIG. 3.

The transistor 40 has its emitter connected to the emitter of transistor 36 and also to ground; its collector is connected to the collector of transistor 36, to one end of the resistor 42 and to the base electrode of one of the main transistors in the flip-flop. The other end of resistor 42 is connected to a negative source of potential 44. The base of transistor 40 is connected to the emitter of the other main transistor in the flip-flop through the parallel combination of resistor 46 and capacitor 48.

Figure 2:
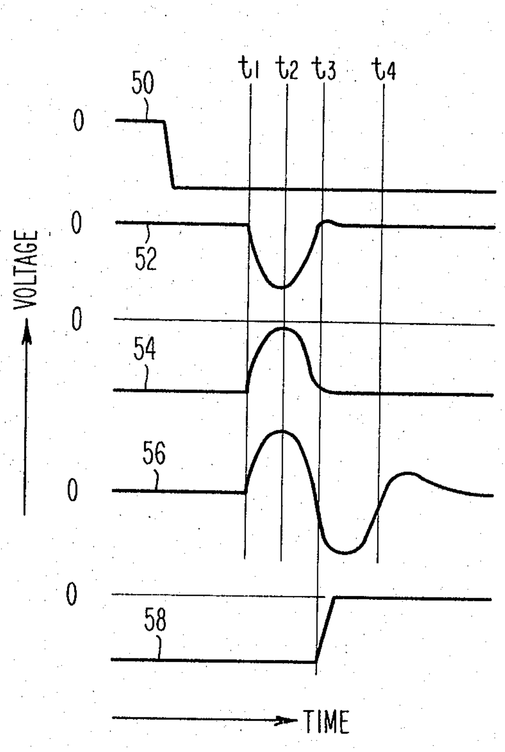
FIG. 2 is a graph of the voltages appearing at various points in the circuit of FIG. 1, having ordinates which represent voltage and abscissae which represent time; and, FIG. 3 is a schematic circuit diagram of a trigger, a flip-flop, and logical gating circuitry which form an illustrative embodiment of the invention.

Referring now in particular to FIG. 2, a plurality of voltage waveforms are shown sharing the abscissa of a graph so as to be one under the other with respect to the time axis and having individual ordinates of voltage, which repeat for each waveform. Each of these waveforms appears at a different point in the circuit of FIG. 1 during the triggering operation.

The curve 50 represents the voltage input to the logic terminal 10. At time $t_1$ this voltage is a negative value which indicates an output from the logic circuit to the triggering network. The curve 52 represents the voltage input to the clock terminal 12. At time $t_1$ this voltage is ZERO and the clock pulse is just starting; this pulse is a half-wave sine and reaches its maximum negative value at time $t_2$. The clock returns to ZERO voltage at time $t_3$. The voltage indicated by the waveform 50 will cause the transistor 14 to be switched on between $t_1$ and $t_3$; the waveform 50 will cause the transistor 20 to be switched on between the same two periods of time.

Since both of the transistors 14 and 20 are switched on between the times $t_1$ and $t_3$, a positive half-wave sine voltage appears at terminal 26. This waveform is indicated by the curve 54. This voltage is approximately equal to the voltage from the negative voltage source at time $t_1$. This is true because before $t_1$, transistor 20 is off, providing a very high impedance as compared to resistor 32. The transistor 20 and the resistor 32 form a voltage divider with most of the voltage dropped across the transistor so as to hold terminal 26 at the negative voltage of voltage source 30. Between times $t_1$ and $t_2$ the transistor 14 is on and the transistor 20 is opening (turning on) thus causing the resistance of the half of the potential divider circuit occupied by the transistors to decrease in relation to the resistor 32. Consequently, the voltage at terminal 26 rises toward ZERO voltage from a negative value. Similarly, between the time $t_2$ and $t_3$ transistor 20 is closing (turning off) causing the voltage at point 26 to fall back to its negative value.

This positive pulse is transmitted through the filter which consists of capacitor 34 and inductor 38 with no phase shift and appears as a positive pulse between times $t_1$ and $t_3$ at one end of inductor 38. This pulse is indicated by the curve 56. Between times $t_3$ and $t_4$ the transistor 20 has closed causing the inductor 38 to discharge its stored energy in the form of a negative pulse to the damping resistor 32. This negative pulse is indicated between times $t_3$ and $t_4$ on curve 56. It appears at the base of transistor 36 switching this transistor on and initiating the switching of the flip-flop. Immediately following time $t_4$ the remainder of the energy in the "ringing" circuit comprised by inductor 38, capacitor 34, and damping resistor 32 causes a positive voltage to appear at the base of transistor 36. This positive pulse is indicated on curve 56 immediately following time $t_4$. It switches the transistor 36 back off.

The curve 58 represents the voltage waveform which appears at the collector of transistors 36 and 40. This voltage is a switching voltage for the flip-flop. It is noted that this voltage goes from a negative value to ZERO, starting at time $t_3$, which is after the clock pulse has terminated. Since the trigger pulse is started at the trailing edge of the clock pulse time race of the flip-flop is prevented. Variations in the clock pulse voltage will not cause accidental switching of the flip-flop so as to read out its information erroneously.

Figure 3:
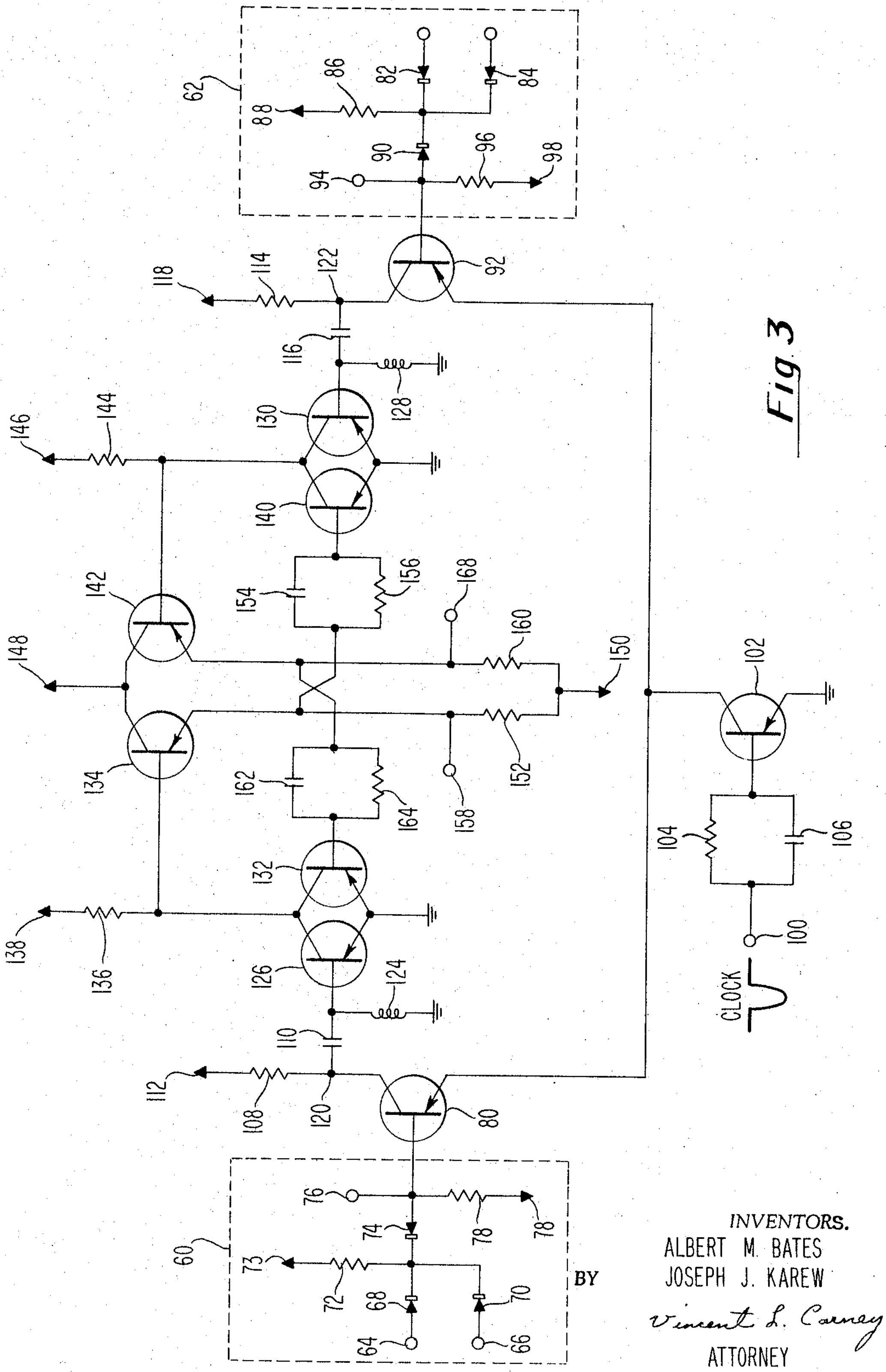

Referring now in particular to FIG. 3, a non-complementing transistor flip-flop is shown, having a first set of logic circuitry indicated generally at 60 to activate one trigger for the flip-flop, and a second set of logic circuitry indicated generally at 62 to activate a second trigger for the second input of the flip-flop.

The logic gating input circuit indicated generally at 60 has two AND gate inputs 64 and 66. Terminal 64 is connected to the anode of diode 68; terminal 66 is connected to the anode of diode 70. The cathodes of diodes 68 and 70 are connected to each other, to one end of resistor 72 and to the cathode of isolation diode 74. The other end of resistor 72 is connected to the source of negative potential 73. The anode of diode 74 is connected to OR input terminal 76, to one end of resistor 78, and to the base of transistor 80. The other end of resistor 78 is connected to a source of positive potential.

If negative input pulses are applied to both terminals 64 and 66, part of the negative voltage that is normally dropped across resistor 72 will appear at the base of transistor 80 so as to switch this transistor on. This will provide the logical AND function to the trigger as described in conjunction with FIG. 1.

A negative input to the logical OR terminal 76 will also bias the transistor 80 into conduction. Several such OR terminals may be used, if necessary in a particular logic function, although only one is shown for illustration. Similarly, many other kinds of logical gating circuitry could be used in the block 60 to activate the trigger circuit.

The logical gating circuitry shown generally at 62 is identical to that shown generally at 60 and is used to activate the reset trigger to the non-complementing flip-flop. The AND inputs are connected to the two diodes 82 and 84, which diodes have their cathodes connected in series with the resistor 86 and the source of negative voltage 88, and are also connected to the cathode of diode 90. The anode of diode 90 is connected to the base of transistor 92, OR gate input 94, and the series connection of resistor 96 and positive voltage source 98.

Clock pulse terminal 100 is connected to the base of PNP transistor 102 through the parallel combination of resistor 104 and capacitor 106. The emitter of transistor 102 is grounded; its collector is connected to both the emitter of transistor 80 and the emitter of transistor 92. The collector of transistor 80 is connected to one end of resistor 108 and to one plate of capacitor 110. The other end of resistor 108 is connected to a source of negative potential 112. The collector of transistor 92 is connected to one end of resistor 114 and to one plate of capacitor 116. The other end of resistor 114 is connected to a negative source of potential 118.

The combination of transistor 102 and transistor 80 in series form one inverting negative AND gate, and the combination of transistor 102 and 92 in series form a second inverting AND gate. The occurrence of a clock pulse on clock pulse terminal 100, which pulse opens transistor 102, with a negative input pulse from the logic gating circuitry indicated generally at 60, which opens transistor 80, causes a positive voltage pulse to be generated at terminal 120 on the collector of transistor 80 in the manner described in connection with FIG. 1. This positive voltage pulse at terminal 120 will set the non-complementing flip-flop. Similarly, the occurrence of a clock pulse on clock pulse input terminal 100, which opens transistor 102, with a negative input pulse from the logic gating circuitry indicated generally at 62, which opens transistor 92, causes a positive voltage pulse to appear at terminal 122 in the manner described in connection with FIG. 1. This pulse will reset the flip-flop if it has been set in one state by a pulse originating at terminal 120.

Capacitor 110 is connected to one end of inductor 124 and also to the base of transistor 126; the other end of inductor 124 is grounded. The positive pulse at terminal 120, which indicates the synchronism of the negative pulse from the logic gating 60 with a clock pulse, is stored by the inductor 124 until the termination of the clock pulse. The inductor 124 then releases stored energy to form a negative pulse which triggers on the transistor 126. This initiates the setting of the flip-flop.

Capacitor 116 is connected to one end of inductor 128 and to the base of transistor 130; the other end of inductor 128 is grounded. The positive pulse at terminal 122, which indicates the synchronism of a negative pulse from the logic gating circuitry indicated generally at 62 with a clock pulse, is stored by the inductor 128. After the clock pulse has terminated the inductor 128 releases its stored energy in the form of a negative pulse to the base of transistor 130. This pulse switches on transistor 130 to initiate the reset action of the flip-flop.

The emitter of transistor 126 is connected to the emitter of PNP transistor 132 and to ground. The collector of transistor 126 is connected to the collector of transistor 132, to the base of PNP transistor 134, which is one of the two main transistors of the flip-flop, and to one end of resistor 136. The other end of resistor 136 is connected to the source of negative potential 138.

The emitter of transistor 130 is connected to the emitter of transistor 140 and to ground. The collector of transistor 130 is connected to the collector of transistor 140, to the base of transistor 142, which is one of the two main transistors in the flip-flop, and to one end of resistor 144. The other end of resistor 144 is connected to the negative source of potential 146.

The collectors of transistors 134 and 142, which are the two main transistors of the flip-flop are each connected to the negative source of potential 148. The emitter of transistor 134 is connected to the source of positive potential 150 through resistor 152, to the base of transistor 140 through the parallel combination of the capacitor 154 and the resistor 156 and to one of the two flip-flop outputs 158. The emitter of transistor 142 is connected to the source of positive potential 150 through resistor 160, to the base of transistor 132 through the parallel combination of the capacitor 162 and the resistor 164, and to the other output of the flip-flop 168.

When transistor 126 is turned on by the concurrence of a clock pulse and a logic input pulse, the flip-flop will be set so as to provide an output at terminal 168. In this process transistor 134 will be turned off, transistor 142 will be turned on, transistor 140 will be turned off, and transistor 132 will be turned on. Then transistor 126 having served its function will be turned off by the trigger.

When the setting of the flip-flop is initiated by turning on transistor 126 with a negative pulse from the inductor 124, the base of transistor 134 is driven in a positive direction towards ground by the flow of current through transistor 126 and resistor 136 to the negative source of potential 138. The transistor 134 is now reverse biased and turned off. This causes the emitter of transistor 134 to rise in voltage in a positive direction towards the voltage of positive source 150 since the current through resistor 152 is now cut off.

This in turn causes a positive voltage to appear at output terminal 158 to provide an off signal rather than the on signal formerly held. It also provides a positive voltage to the base of transistor 140 cutting this transistor off. This then causes the base of transistor 142 to become negative by approaching the voltage of the negative source 146, which is no longer receiving current through transistor 140 and resistor 144.

The emitter of transmitter 142 is now driven towards the negative value approaching that of negative source 148 by the flow of current from the source 150 through resistor 160 through transistor 142 and to the source of negative voltage 148. Consequently, output 168 provides the required negative off signal. Also, the negative voltage is provided to the base of transistor 132 from the emitter of transistor 142 so as to switch this transistor on in parallel with transistor 126. Now transistor 126 is switched off by the remaining energy in the "ringing" circuit composed of capacitor 110 and inductor 124 without changing the state of the flip-flop since parallel transistor 132 is held open.

Similarly, the flip-flop is reset so as to provide a negative output at terminal 158 and a positive output at terminal 168 by a positive pulse at terminal 122. A positive pulse is generated at terminal 122 by the concurrence of a clock pulse and a logical input pulse from the logic gating circuitry 62. The inductor 128 provides a negative pulse to transistor 130 which drives the base of transistor 142 in a positive direction os as to cut this transistor off. This in turn drives the emitter of transistor 142 to a positive voltage so as to provide a positive off signal at terminal 168. It also drives the base of transistor 132 to a positive value so as to cut this transistor off which in turn switches transistor 134 to the conducting state. The emitter of transistor 134 now has a negative potential so as to provide the required negative output signal at terminal 158. This negative potential turns on transistor 140 thus enabling transistor 130 to return to its off condition.

This invention provides a flip-flop and a trigger circuit which may operate at very high rates without time race difficulties. The flip-flop of this invention may be triggered at clock rates in excess of 5 megacycles using Philco type 2N496 transistors having a gain-bandwidth figure of merit of 12 megacycles. The flip-flop is simple and economical. It makes use of dynamic switching.

Obviously, many modifications and variations of the present invention are possible in the light of the above teachings. It is therefore to be understood that within the scope of the appended claims, the invention may be practiced otherwise than as specifically described.

What is claimed is:

1. Apparatus for switching an active circuit element having a two-terminal input circuit from a first state to a second state comprising:

input means providing a first voltage pulse having a predetermined pulse width and a polarity opposite that necessary to switch said active circuit element from said first state to said second state; and resonant differentiating means which resonates at a frequency the period of which is approximately double the duration of said voltage pulse, for producing only one pulse having a polarity opposite the polarity of said first pulse after the termination of said first pulse, of switching magnitude for said active circuit element, and which comprises a series network including inductance means, a capacitor connected directly to said inductance means at one end and resistance damping means;

said input means being electrically connected across said capacitor and said inductance means, and said inductance means being electrically connected across the input circuit of said active element.

2. The combination comprising:

a multivibrator having at least one two-terminal input circuit;

input means for receiving a voltage pulse; and ringing trigger means, electrically connecting said input means to said multivibrator and comprising inductance means electrically connected across said multivibrator input circuit, a capacitor having one plate connected directly to said inductance means at one end, and resistance damping means electrically connected to the other plate of said capacitor to form a damped series resonant network, for switching said multivibrator from one state to another state at the end of the trailing edge of said voltage pulse, the period of the frequency of said resonant network being at least double the duration of said voltage pulse, and said damping means effectively limiting the duration of the resonant condition to three half-cycles.

3. A trigger for a flip-flop, said flip-flop having at least one two-terminal input circuit, comprising:

input means providing a half-cycle voltage pulse of a predetermined frequency;

a capacitor having one plate electrically connected to said input means;

an inductor having one end connected directly to the other plate of said capacitor and being electrically connected across said flip-flop input circuit; and resistance damping means in electrical series with said capacitor and inductor;

the capacitance of said capacitor in farads multiplied by the inductance of said inductor in henries being approximately equal to the reciprocal of 2 pi squared multiplied by the reciprocal of said predetermined frequency squared, said flip-flop being triggered only by pulses of the polarity opposite that of said voltage pulse.

4. A trigger for a flip-flop, said flip-flop having at least one two-terminal input circuit, comprising:

a logic input terminal;

clock pulse means having a predetermined frequency;

gating means, electrically connected to said logic input terminal and to said clock pulse means, for providing a voltage pulse to a gate output terminal when said gating means receives an input pulse on said logic input terminal concurrently with a clock pulse;

a capacitor having one plate electrically connected to said gate output terminal;

an inductor having one end connected to the other plate of said capacitor and being electrically connected across said flip-flop input circuit; and resistance damping means in electrical series with said capacitor and inductor;

the capacitance in farads multiplied by the inductance of said inductor in henries being approximately equal to the reciprocal of 2 pi squared multiplied by the reciprocal of said predetermined frequency squared, said flip-flop being triggered only by pulses of the polarity opposite that of said voltage pulse.

5. A trigger for a flip-flop according to claim 4 in which said inductor is grounded at its other end.

6. A trigger for a flip-flop according to claim 5 in which said gate means comprises:

a first PNP transistor having its emitter grounded and its base electrically connected to said clock pulse input terminal;

a second PNP transistor having its emitter electrically connected to the collector of said first PNP transistor and having its base electrically connected to said logic input terminal;

a resistor having one end electrically connected to the collector of said second PNP transistor; and a negative source of potential connected to the other end of said resistor;

said one plate of said capacitor being electrically connected to said collector of said second transistor.

7. A bistable device comprising:

a flip-flop having an input terminal, a ground terminal and two output terminals; and ringing input trigger means comprising inductance means electrically connected between said input and ground terminals, a capacitor connected directly to said inductance means at one end and resistance damping means in electrical series therewith, the capacitance and inductance of said capacitor and inductance means, respectively, being preselected for storing energy from input pulses and for producing only one trigger pulse of the polarity opposite to that of said input pulses at the end of an input pulse effective to switch said flip-flop from one state to the other at the end of the trailing edge of an input pulse whereby the output from said bistable device will appear on a different one of said two output terminals.

8. A bistable device according to claim 7 in which said ringing input trigger means further comprises:

a PNP transistor having its emitter grounded and its base electrically connected to a clock pulse input terminal;

a damping resistor electrically connected at one end to the collector of said PNP transistor and at the other end to a source of negative potential;

a capacitor having one plate electrically connected to said collector of said PNP transistor; and an inductor having one end connected to the other plate of said capacitor and to an output terminal of said trigger means; the other end of said inductor being grounded.

9. A bistable device according to claim 8 in which said flip-flop is a non-complementing transistorized flip-flop having dynamic cross-coupling circuit means electrically connected between the base electrodes and the emitter electrodes of the output transistors of said flip-flop and having trigger input terminals electrically connected to said cross-coupling circuit means.

10. A rapid anti-time race flip-flop comprising:

first and second logic input terminals adapted to receive switching voltages for said flip-flop;

a clock pulse input terminal adapted to receive synchronizing voltages;

a first input PNP transistor having its emitter grounded and its base connected to said clock pulse input terminal;

second and third input PNP transistors having their bases electrically connected to said first and second logic input terminals respectively, having their emitters electrically connected to the collector of said first input transistor, and each having their collectors electrically connected to a source of negative potential through resistors;

first and second trigger capacitors each having one plate electrically connected to a respective one of the collectors of said second and third input transistors;

first and second trigger inductors each having one end electrically connected to a respective one of the second plates of said first and second trigger capacitors and each having its other end grounded;

first and second trigger PNP transistors each having its base electrically connected to a respective one of said first and second trigger inductors and each having its emitter grounded;

first and second PNP cross-over transistors each having its collector connected to a respective one of the collectors of said first and second trigger transistors and each having its emitter grounded;

said first and second trigger transistors and said first and second cross-over transistors each having its collector electrically connected to a source of negative potential through a resistor;

first and second PNP output transistors each having its base electrically connected to a respective one of the collectors of said first and second cross-over transistors;

said first and second output transistors having their collectors connected to a negative source of potential and their emitters connected to a positive source of potential through a resistor;

a first cross-over network electrically connecting the base of said first cross-over transistor to the emitter of said second output transistor;

said first cross-over network comprising the parallel combination of a capacitor and a resistor;

a second cross-over network electrically connecting the base of said second cross-over transistor to the emitter of said first output transistor;

said second cross-over network comprising the parallel combination of a capacitor and a resistor; and first and second output terminals electrically connected to the emitters of a respective one of said first and second output transistors.

References Cited by the Examiner

UNITED STATES PATENTS

| | | | |
|---|---|---|---|
| 2,906,892 | 9/1959 | Jones | 307—88.5 |
| 3,020,418 | 2/1962 | Emile | 307—88.5 |
| 3,047,732 | 7/1962 | Skerritt | 307—88.5 |
| 3,100,848 | 8/1963 | Skerritt | 307—88.5 |
| 3,102,208 | 8/1963 | Reach | 307—88.5 |
| 3,171,039 | 2/1965 | Lorenz | 307—88.5 |

References Cited by the Applicant

UNITED STATES PATENTS

| | | |
|---|---|---|
| 3,036,223 | 5/1962 | Phillips. |
| 3,146,355 | 8/1964 | Clapper. |
| 3,152,267 | 10/1964 | Clapper. |
| 3,174,055 | 3/1965 | Clapper. |

OTHER REFERENCES

I.B.M. Technical Disclosure Bulletin, "Amplifier Circuit," by Skerritt, Mar. 10, 1961, vol. 3, No. 10, page 89.

RCA Computer-Transistor and Tunnel Diode Application Circuits, Jan. 19, 1962. Sheet No. 4.

JOHN W. HUCKERT, *Primary Examiner.*

J. D. CRAIG, *Assistant Examiner.*